United States Patent [19]

Smart

[11] Patent Number: 4,802,922
[45] Date of Patent: Feb. 7, 1989

[54] CAPSULES OF HIGH ALUMINA CEMENT COMPOSITIONS

[75] Inventor: Roderick M. Smart, Birmingham, United Kingdom

[73] Assignee: Fosroc International Limited, Birmingham, England

[21] Appl. No.: 34,526

[22] Filed: Apr. 3, 1987

[30] Foreign Application Priority Data

Nov. 4, 1986 [GB] United Kingdom ............... 8608715
Nov. 4, 1986 [GB] United Kingdom ............... 8608716

[51] Int. Cl.⁴ .............................................. C04B 7/19
[52] U.S. Cl. ..................................... 106/89; 106/104; 405/261
[58] Field of Search ................. 106/89, 104; 405/261

[56] References Cited

U.S. PATENT DOCUMENTS

| 4,126,005 | 11/1978 | Coursen | 405/261 |
| 4,352,693 | 10/1982 | Langdon | 106/104 |
| 4,399,911 | 8/1983 | Murphy et al. | 206/219 |
| 4,534,795 | 8/1985 | Lewis et al. | 106/104 |

FOREIGN PATENT DOCUMENTS

| 443460 | 1/1972 | Australia. |
| 641700 | 2/1937 | Fed. Rep. of Germany. |
| 907292 | 10/1962 | United Kingdom. |

OTHER PUBLICATIONS

Chemical Abstracts 100:108,284t (1984).
Chemical Abstracts 102:189,903k (1985).
"Chemistry of Cement and Concrete", 3rd Ed. by Lea, (1970).

*Primary Examiner*—Steven Capella
*Attorney, Agent, or Firm*—Caesar, Rivise, Bernstein, Cohen & Pokotilow, Ltd.

[57] ABSTRACT

A capsule contains in separate compartments the interactive components of a self setting composition which according to the invention comprise as base component a paste of high alumina cement, water and a source of CaO and $SiO_2$—e.g. as a single source granulated blast furnace slag; and as a catalyst component a paste of lime, water and a water soluble lithium salt. When reacted the components form a set cement containing hydrated phases typical of an OPC.

14 Claims, 1 Drawing Sheet

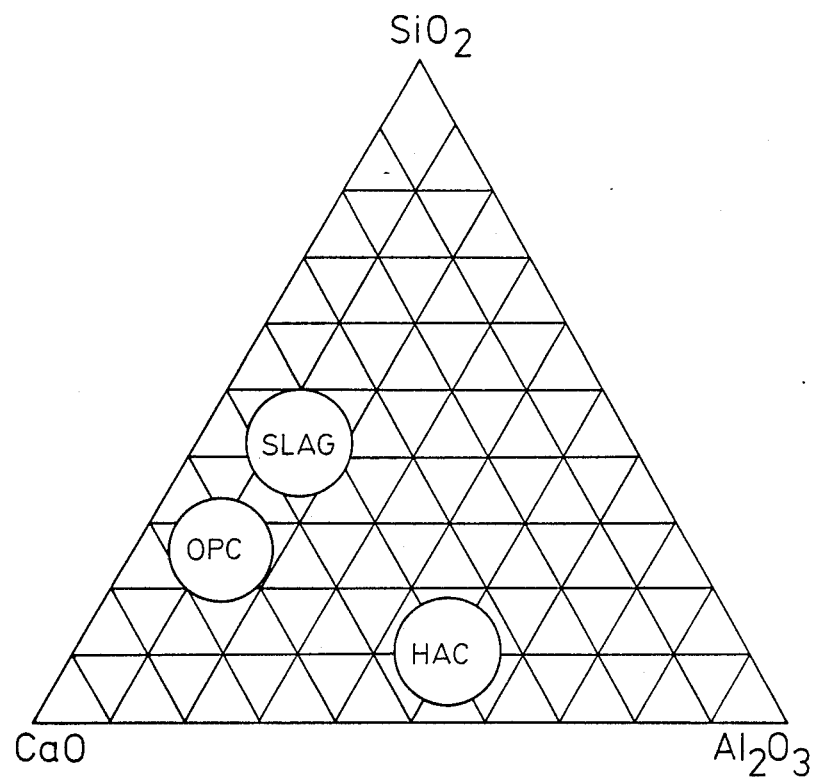

CAPSULES OF HIGH ALUMINA CEMENT COMPOSITIONS

The invention relates to capsules containing the interactive components of a self-setting composition, the components being housed in separate compartments until the capsule is broken. Such a capsule may be used for example to anchor an element in a borehole, e.g. in a mine gallery roof.

Capsules of this class are known, and they fall into different types dependent on the nature of the self-setting composition. The composition may be organic as in the case of polyester systems or inorganic as in the case of cementitious systems. This invention is concerned with capsules containing a cementitious system the interactive components of which comprise a cement and water or cement and a catalyst therefor. The components are typically a base component (the cement) and a catalyst component.

A cementitious composition may be based on Ordinary Portland Cement (OPC). This has the disadvantage of a slow rate of set. There is claimed in our European patent No. 0113593 (casee CBP139) a capsule containing a cementitious composition based on high alumina cement (HAC) the rate of set of which can be controlled. The use of HAC has its limitations, in particular a tendency for the hydrated cement to undergo HAC conversion which may lead to problems caused by loss of strength.

It is an object of this invention to provide a capsule containing a cementitious composition which has the advantages of the use of HAC without the disadvantages. In particular, a long shelf life and controlled rate of set, without any substantial deterioration in the ultimate strength or other adverse effect.

The invention is based on the realisation that the incorporation in the base component of a filler which is substantially inert with respect to the other ingredients of the base component but which will be activated by the catalyst component when the components are mixed, will secure these advantages.

According to one aspect of the invention there is provided a frangible capsule containing in separate compartments the interactive components of a self-setting cementitious composition, one component being a base component and comprising high alumina cement, retarders and water, and the other component being a catalyst component and comprising lime and water, is characterised in that the base component also includes $CaO$ and $SiO_2$ in sufficient quantities such that on hydration of the cement, the hydrate phases of a hydrated Portland cement are formed.

The $CaO$ and $SiO_2$ may be provided by separate sources or a single source may be used. Preferred single sources are pulverised fly ash, silica fume and pozzolans such as Tripoli (available in the USA) and diatomaceous earths. It is a much preferred feature of the invention that the additives are supplied in a form which is non reactive with water, and for this purpose we prefer to use ground granulated blast furnace slag. The blast furnace slag may be of any known type, and derived from any commercial source. The particle size may vary widely but the size should be related to that of the cement particles. The ground granulated blast furnace slag preferably has a minimum fineness of $275 m^2/kg$, and a bulk density of $1200$ $kgm^{-3}$ and an approximate specific gravity of 2.9. Such slags are made from rapidly cooled blast furnace slag which is the ground to the degree of fineness indicated.

The hydrated phases in a set OPC cement are (cement chemistry notation) typically
CSH
$C_4AH_{13}$
$Ca(OH)_2$
$C_2ASH_8$ whereas in a set HAC cement the hydrated phases are typically
$CAH_{10}$
$C_2AH_8$
$C_3AH_6$
$C_2ASH_8$ (minor amount).

It is a surprising feature of the invention that by adding sources of $CaO$ and $SiO_2$ in sufficient quantities to an HAC cement the hydrated phases typical of an OPC are formed. The effect is illustrated in the oxide composition diagram of the accompanying drawing. The three main oxides which occur in cement systems are $CaO$ (lime), $Al_2O_3$ (alumina) and $SiO_2$ (silica). It will be seen that the oxide phases in the OPC and in the slag are relatively low in $Al_2O_3$, whereas that of the HAC is high. According to the invention by adding slag in sufficient quantity to the HAC, the set cement has an oxide composition more typical of OPC. So far as we are aware no one has yet appreciated the effect just described. Blast furnace slag is a well known reactive filler often used in OPC compositions but is not, to our knowledge, present in a commercially available HAC composition. For example, the British Board of Agrement certificate 82/1023 CEMSAVE ground granulated blast furnace slag lists the cements with which that material can be used and does not mention HAC. In a search done by the European Patent Office prior to the date of the present application the following documents were noted:

U.S. Pat. No. 1,803,582 which discloses the addition of a granulated cast iron slag containing bicalcic silicate to an aluminous cement to improve the properties of the cement.

FR-A No. 797493 which discloses a composition comprising HAC and a suitably treated and selected blast furnace slag cement.

DE-A No. 1198723 which discloses a composition comprising both OPC and HAC with the optional addition of calcium oxide.

None of these documents discloses the invention of the present application namely that a paste of HAC, the defined $CaO$ and $SiO_2$ and water, when reacted with a paste of lime, catalyst and water will form a set cement comprising the hydrate phases of hydrated OPC.

It is a feature of the invention that the cement-component be essentially free of OPC otherwise the rate of set of the interactive components will not be suitable. It is also a feature of the invention that the base component be reacted with a catalyst component.

It is a further surprising feature of the invention that the proportion of the blast furnace slag may be varied widely relative to the HAC without substantially affecting the rate of set of the interacted composition. It is a preferred feature of the invention that the composition undergo an initial set within less than 15 minutes, ideally about 4 minutes. In our evaluations we have been able to use ratios from about 1:1 up to about 8:1 by weight and keep the rate of set within the preferred time scale.

One advantage of the capsule of the invention is the prolonged shelf life, of at least 6 months and often for a year.

The interacted components are capable of achieving initial set times between about 1 and 10 minutes, preferably about 3 to about 5 minutes. The set composition after 30 minutes, will have a shear strength of about 7.5N/mm$^2$ and a compressive strength of about 17N/mm$^2$.

The cementitious material in the composition is so-called high alumina cement. This material is known under a variety of names in different countries, for example "Cement Fondue" and "alumina cement" or "supra alumina cement". The content of alumina in the cement varies from country to country, sometimes being as low as 30% and other times being over 77%. The invention is applicable to all such alumina cements.

The catalyst component need only comprise a paste of a base material, such as lime and water. However for a fast rate of set, it also most preferably comprises a catalyst for the cement. A catalyst for the high alumina cement is preferably a lithium derivative which is preferably lithium carbonate, lithium sulphate or lithium hydroxide. Any lithium salt may be used provided it is water soluble and compatible with the other ingredients. Trisodium nitrilotriacetate, which will prevent the lime from forming a thick paste, in a proportion of about 0.5 to 2 parts relative to the base, is preferably present.

As taught in our European patent publication No. 0113593 (my ref: CBP 139) sequestrants and the like may be present.

The base component preferably has a pH of the order of about 8.5. When components are mixed the set composition will have a pH of the order of about 11.

The composition may include other ingredients, e.g. water reducing agents, expanding agents, surfactants, colourants, latex emulsions, anti-foaming agents and plasticisers. As indicated, OPC should be avoided. Other accelerators may be present, e.g. sodium carbonate, sodium sulphate, calcium chloride, sodium hydroxide, ferrous sulphate, sulphuric acid, acetic acid, calcium sulphate, etc. A thixotropic, thickening agent or air entraining agent may be present if water bleed on storage and a loss of grout composition is to be minimised, a point especially important in overhead or fissured rock applications. Polymeric additives such as cellulose ethers, polyacrylamides and polyethylene oxides, or montmorillonite type clays may be present.

The capsule may be of any suitable shape so long as the two interactive components are housed in separate compartments for storage. When required and in known manner, an anchoring element is used to rupture the capsule, open the compartments and intermix the interactive components. The capsule may range from 20 to 40 mm in diameter and 200 to 600 mm in length, and may be used in boreholes ranging from about 25 mm to about 50 mm in diameter. The boreholes may be drilled in the wall or roof of a coal mine, gold mine, iron ore mine, quarry or civil engineering structures.

The invention further includes a base component for reaction with a catalyst component comprising lime and water, characterised in that the base component comprises a paste of high alumina cement and water and CaO and SiO$_2$ in sufficient quantities such that on hydration of the cement the hydrate phases of a hydrated Portland cement are formed.

In order that the invention may be well understood, it will now be described by way of example with reference to the following examples, in which parts are by weight unless otherwise indicated.

EXAMPLE I

A catalyst component was made as a paste of

| ingredient | parts |
| --- | --- |
| slaked lime | 53.1 |
| water | 35.4 |
| lithium hydroxide | 6.6 |
| magnesium sulphate | 2.7 |
| trisodium nitroloacetate | 1.8 |
| citric acid | 0.4 |

A range of base compositions was made up as shown in Table I. The compositions were stored for several months and then the interactive components mixed. The set times, shear strengths and compressive strengths were measured as shown in Tables II and III. From these results it is clear that the set composition has excellent characteristics.

EXAMPLE II

Capsules according to selected formulations of Example I were made up and allowed to set in comparison with two commercially available capsules LOKSET LF6, according to patent publication No. EP0046037 (LOKSET is a registered trade mark.)

EC PHIX W, available from Celtite Ltd., Alfreton, Derbyshire, England.

The shear strengths and rate of strength development are shown in Tables IV and V respectively from which it can be seen that the capsules of the invention have much better properties.

TABLE I

| | Composition | | | | | | | | | | | |
| --- | --- | --- | --- | --- | --- | --- | --- | --- | --- | --- | --- | --- |
| | 1 | 2 | 3 | 4 | 5 | 6 | 7 | 8 | 9 | 10 | 11 | 12 |
| high alumina cement | (control) 68.4 | 58.4 | 48.9 | 42.7 | 38.6 | 34.0 | 30.8 | 28.0 | 25.7 | 19.3 | 15.4 | 13.0 |
| blast furnace slag (ground granulated) | 0 | 14.6 | 24.5 | 32.0 | 38.6 | 42.5 | 46.3 | 49.1 | 51.4 | 57.8 | 61.6 | 65.0 |
| water | 18.4 | 18.4 | 18.4 | 18.4 | 18.4 | 18.4 | 18.4 | 18.4 | 18.4 | 18.4 | 18.4 | 18.4 |
| silica fume | 8.6 | 8.6 | 8.6 | 8.6 | 8.6 | 8.6 | 8.6 | 8.6 | 8.6 | 8.6 | 8.6 | 8.6 |
| zinc borate | 3.3 | 3.3 | 3.3 | 3.3 | 3.3 | 3.3 | 3.3 | 3.3 | 3.3 | 3.3 | 3.3 | 3.3 |
| EDTA (sodium salt) | 1.2 | 1.2 | 1.2 | 1.2 | 1.2 | 1.2 | 1.2 | 1.2 | 1.2 | 1.2 | 1.2 | 1.2 |
| water soluble polymers | 0.1 | 0.1 | 0.1 | 0.1 | 0.1 | 0.1 | 0.1 | 0.1 | 0.1 | 0.1 | 0.1 | 0.1 |

EDTA = ethylene diamine tetraacetic acid

TABLE II

SET TIMES AND SHEAR STRENGTHS OF GROUTS

| COMPOSITION NO. | INITIAL SET (minutes) | SHEAR STRENGTHS (N/mm$^2$) | | | | | | |
|---|---|---|---|---|---|---|---|---|
| | | ½ Hr. | 2 Hrs. | 24 Hrs. | 7 d. | 28 d. | 2 mnth | 6 mnth |
| 1 Control | 4 | 7.5 | 19.3 | 11.1 | 16.8 | 21.2 | 25.6 | 28.9 |
| 2 | 3.½ | 6.6 | 8.5 | 12.1 | 18.1 | 24.1 | 26.7 | 30.9 |
| 3 | 3.½ | 6.0 | 8.2 | 12.0 | 19.6 | 24.0 | 25.4 | 31.2 |
| 4 | 3 | 5.8 | 7.8 | 12.5 | 19.6 | 23.1 | 27.2 | 29.4 |
| 5 | 3 | 5.0 | 6.7 | 11.6 | 18.8 | 23.2 | 26.5 | 33.4 |
| 6 | 3 | 4.6 | 5.6 | 12.5 | 17.0 | 22.9 | 25.7 | 28.3 |
| 7 | 2.½ | 4.1 | 4.9 | 11.5 | 16.9 | 22.5 | 27.4 | 34.2 |
| 8 | 2.½ | 3.7 | 4.6 | 10.4 | 16.4 | 21.7 | 25.8 | 29.8 |
| 9 | 2.½ | 3.0 | 4.5 | 10.0 | 15.6 | 20.8 | 28.8 | 29.3 |
| 10 | 5 | 1.6 | 3.5 | 7.1 | 16.1 | 20.3 | 27.8 | 30.2 |
| 11 | 6 | 1.1 | 2.5 | 5.0 | 13.0 | 19.0 | 24.0 | 29.4 |
| 12 | 7 | 0.9 | 2.1 | 4.3 | 11.6 | 18.9 | 22.4 | 28.6 |

TABLE III

COMPRESSIVE STRENGTHS OF GROUTS

| FORMULATION NO. | COMPRESSIVE STRENGTHS (N/mm$^2$) | | | | | | |
|---|---|---|---|---|---|---|---|
| | ½ Hr. | 2 Hrs. | 24 Hrs. | 7 d. | 28 d. | 2 month | 6 month |
| 1 Control | 18.2 | 21.2 | 25.4 | 38.3 | 47.4 | 53.3 | 60.8 |
| 2 | 16.1 | 17.8 | 25.6 | 38.0 | 55.0 | 60.4 | 70.3 |
| 3 | 13.5 | 18.0 | 19.9 | 39.2 | 52.1 | 53.1 | 71.4 |
| 4 | 10.7 | 14.4 | 22.6 | 34.9 | 48.2 | 54.4 | 73.2 |
| 5 | 9.4 | 12.7 | 22.4 | 34.0 | 43.6 | 53.1 | 66.7 |
| 6 | 8.7 | 11.7 | 21.9 | 25.2 | 46.6 | 57.4 | 67.2 |
| 7 | 7.3 | 9.0 | 17.7 | 35.5 | 41.5 | 59.0 | 70.2 |
| 8 | 6.9 | 9.7 | 17.7 | 28.8 | 40.0 | 51.9 | 68.4 |
| 9 | 5.1 | 9.7 | 17.0 | 26.3 | 40.6 | 50.9 | 66.9 |
| 10 | 5.2 | 9.7 | 17.5 | 25.8 | 43.6 | 45.6 | 71.8 |
| 11 | 4.0 | 4.9 | 14.6 | 24.9 | 48.9 | 51.0 | 70.1 |
| 12 | 2.8 | 4.4 | 9.7 | 28.0 | 47.9 | 54.6 | 69.8 |

TABLE IV

STRENGTH DEVELOPMENT RATE OF DIFFERENT CAPSULES OF EXAMPLE II

| GROUT | TIME AFTER MIXING | | | | |
|---|---|---|---|---|---|
| | 15 m. | ½ Hr. | 1 Hr. | 2 Hrs. | 3 Hrs. |
| COMPOSITION 1 OF TABLE I | 4.7 | 7.4 | 8.5 | 9.2 | 9.7 |
| COMPOSITION 5 OF TABLE I | 3.0 | 5.0 | 6.1 | 6.7 | 7.1 |
| COMPOSITION 9 OF TABLE I | 1.9 | 3.0 | 4.0 | 4.7 | 5.3 |
| LOKSET LF6 | 10.6 | 12.6 | 13.6 | 13.9 | 14.0 |
| CELTITE EC PHIX W | 3.2 | 5.3 | 6.6 | 7.2 | 7.3 |

TABLE V

STRENGTH OF DIFFERENT CAPSULES OF EXAMPLE II

| GROUT | SHEAR STRENGTHS (N/mm$^2$) | | |
|---|---|---|---|
| | 7 DAY | 28 DAY | 2 MONTH |
| COMPOSITION 1 | 16.8 | 21.2 | 25.6 |
| COMPOSITION 5 | 18.8 | 23.2 | 26.5 |
| COMPOSITION 9 | 15.6 | 20.8 | 28.8 |
| LOKSET LF6 | 15.0 | 15.0 | 15.0 |
| CELTITE EC PHIX W | 9.0 | 9.0 | 9.0 |

I claim:

1. A frangible capsule containing in separate compartments the interactive components of a self-setting cementitious composition, one component being a base component and comprising high alumina cement, retarders, a reactive filler and water, and the other component being a catalyst component and comprising lime and water, wherein the fillers of the base component includes both CaO and SiO$_2$ in sufficient quantity such that when the interactive components are interacted the hydrate phases of a hydrated Portland cement are formed.

2. A capsule according to claim 1, wherein a single source of the CaO and SiO$_2$ is present.

3. A capsule according to claim 2, wherein the CaO and SiO$_2$ are provided by pulverised fly ash, silica fume, a pozzolan or diatomaceous earth.

4. A capsule according to claim 1, wherein the CaO and SiO$_2$ are supplied as a material which is substantially non-reactive with water.

5. A capsule according to claim 4, wherein the CaO and SiO$_2$ are provided by granulated blast furnace slag.

6. A capsule according to claim 5, wherein the granulated blast furnace slag has a minimum fineness of 275m$^2$/Kg, a bulk density of 1200 Kgm$^{-3}$ and an approximate specific gravity of 2.9.

7. A capsule according to claim 1, wherein the CaO and SiO$_2$ are present in a combined weight ratio of from about 1:1 to about 8:1 realtive to the high alumina cement.

8. A capsule according to claim 1, wherein the base component includes sufficient water to form a paste.

9. A capsule according to claim 1, wherein the catalyst component comprises lime, water and a water soluble lithium salt.

10. A base component for reaction with a catalyst component comprising lime and water, wherein the base component comprises a paste of high alumina cement and water and CaO and SiO$_2$ in sufficient quantities such that on hydration of the cement the hydrate phases of a hydrated Portland cement are formed.

11. A paste according to claim 10, wherein the CaO and SiO$_2$ are present in a combined weight ratio of from about 1:1 to about 8:1 relative to the high alumina cement.

12. A paste according to claim 10, wherein the CaO and SiO$_2$ are provided by pulverised fly ash, silica fume, a pozzolan or diatomaceous earth.

13. A paste according to claim 10, wherein the CaO and SiO$_2$ are supplied as a material which is substantially non-reactive with water.

14. A paste according to claim 10, wherein the CaO and SiO$_2$ are provided by granulated blast furnace slag which has a minimum fineness of 275m$^2$/Kg, a bulk density of 1200 Kgm$^{-3}$ and an approximate specific gravity of 2.9.

* * * * *